A. W. WEBSTER.
Button-Hole Cutter-Guides.
No. 147,209. Patented Feb. 3, 1874.
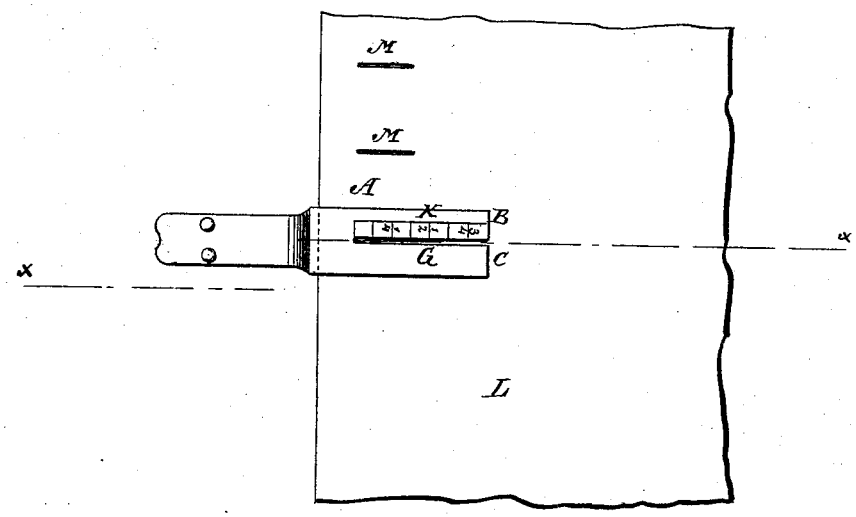
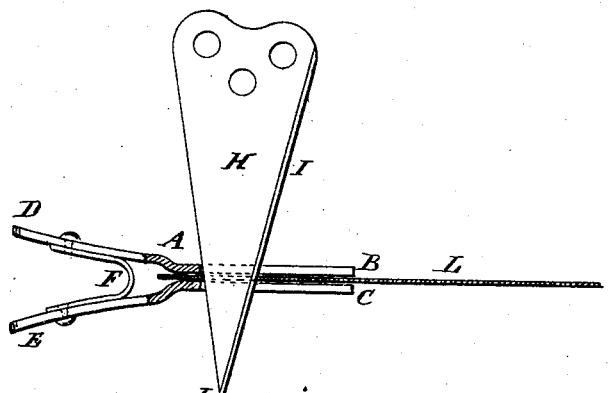
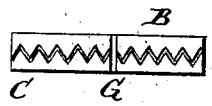
WITNESSES.
INVENTOR:
A. W. Webster
BY
ATTORNEYS.

UNITED STATES PATENT OFFICE.

ALBERT W. WEBSTER, OF ANSONIA, CONNECTICUT.

IMPROVEMENT IN BUTTON-HOLE-CUTTER GUIDES.

Specification forming part of Letters Patent No. 147,209, dated February 3, 1874; application filed January 10, 1874.

*To all whom it may concern:*

Be it known that I, ALBERT W. WEBSTER, of Ansonia, in the county of New Haven and State of Connecticut, have invented a new and useful Improvement in Guide for Cutting Button-Holes, of which the following is a specification:

The object of this invention is to furnish a convenient guide for cutting button-holes through cloth, one that shall firmly hold the cloth and not confine the button-hole to the length of the slot in the guide; and it consists of a guide made with an open slot for guiding the knife or cutter, and with serrated jaws for holding the cloth to be cut, and in the general construction of the guide with a cutter or knife.

Figure 1 is a top view, representing the guide attached to the cloth and ready for the cutter. Fig. 2 is a section of Fig. 1 taken on the line $x\,x$, showing a part of the guide in longitudinal section. Fig. 3 is an end view of the guide, showing the serrations.

Similar letters of reference indicate corresponding parts.

A is the guide, consisting of two jaws, B and C, which are in contact with each other when they are not in use, as seen in Fig. 3. D and E are the shanks, which are spread or bent so as to admit a spring, F, between them. This spring forces the shank apart and the jaws in contact, as represented in the drawing. G is a longitudinal slot through both jaws, extending from the outer end an inch, more or less, parallel with the sides, as seen in Fig. 1. This slot guides the knife in cutting the button-hole. H is the knife-cutter, having cutting-edge I on one side, and a sharp point, J.

When the guide is at the desired place on the cloth, the cutter is placed in the slot and is thrust through the cloth, as seen in Fig. 2. By forcing the cutter down the button-hole may be cut to the entire width of the cloth.

The knife may be wider than the length of the slot in the guide, so as to cut a button-hole longer than the slot, if desired; or the cutter may be carried outward more or less to cut a hole longer than the slot. Ordinarily the cut of the knife would be regulated by the lines and figures on the side of the jaw, as seen at K.

For the purpose of preventing the slipping of the jaws on the cloth, I notch or serrate their inner sides, as seen in Fig. 3. This end view is much magnified in the drawing, as the teeth or serrations are only designed to present a roughened surface, which shall prevent the slipping of the guide laterally, and fine longitudinal grooves or serrations have the desired effect.

In applying the guide to the cloth, the jaws are opened by pressing with the thumb and finger on the ends of the shanks. When the guide is in the desired position the pressure is removed, and the guide is self-fastening and retains its position on the cloth until it is removed.

L represents the cloth; M M, button-holes.

The jaws B C besides serving to hold the cloth while the button-holes are being cut, serve also to hold it while they are being worked, the jaws being adjusted on the cloth, so that the button-hole will lie parallel with, and just outside of, the jaws.

Having thus described my invention, I claim as new and desire to secure by Letters Patent—

A button-hole-cutter guide, constructed as described—that is, composed of two serrated jaws, B C, slotted from the end longitudinally, having shanks D E, and a spring, F, between the shanks, as shown and described.

ALBERT W. WEBSTER.

Witnesses:
T. B. MOSHER,
ALEX. F. ROBERTS.